(12) United States Patent
Takagi

(10) Patent No.: US 9,536,291 B2
(45) Date of Patent: Jan. 3, 2017

(54) IMAGE PROCESSING DEVICE, IMAGE PROCESSING METHOD, AND PROGRAM

(71) Applicant: CANON KABUSHIKI KAISHA, Tokyo (JP)

(72) Inventor: Shin Takagi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/814,125

(22) Filed: Jul. 30, 2015

(65) Prior Publication Data

US 2016/0035067 A1    Feb. 4, 2016

(30) Foreign Application Priority Data

Jul. 31, 2014    (JP) ................................. 2014-156549

(51) Int. Cl.
*G06K 9/40*    (2006.01)
*G06T 5/20*    (2006.01)

(52) U.S. Cl.
CPC ...................................... *G06T 5/20* (2013.01)

(58) Field of Classification Search
CPC ........ G06F 17/16; G06F 17/2252; G06K 9/40; G06T 5/002; G06T 5/003; G06T 5/004; G06T 5/005; G06T 5/006; G06T 5/20; G06T 7/403; G06T 2207/20024; G06T 2207/20028; G06T 9/40; H03M 7/405
See application file for complete search history.

(56) References Cited

U.S. PATENT DOCUMENTS

2006/0291741 A1*    12/2006    Gomi ..................... G06T 3/403
                                                        382/266

FOREIGN PATENT DOCUMENTS

JP        2004-145615 A        5/2004

* cited by examiner

*Primary Examiner* — Duy M Dang
(74) *Attorney, Agent, or Firm* — Canon USA, Inc. IP Division

(57) ABSTRACT

To suppress influence of a rounding error and acquire a more highly precise filter processing result, by performing convolution processing in order from a divided filter having a smaller sum of filter coefficient among divided filters, shifting a position of the decimal point of a filter processing result in a fixed-point format to generate an intermediate image, integrating the filter processing result having a larger bit width of a decimal part, and substantially reflecting a processing result of the decimal part.

15 Claims, 5 Drawing Sheets

1. FIRST INTEGRATION

2. SECOND INTEGRATION

1. FIRST INTEGRATION

2. SECOND INTEGRATION

IMAGE PROCESSING DEVICE, IMAGE PROCESSING METHOD, AND PROGRAM

BACKGROUND OF THE INVENTION

Field of the Invention

The present invention relates to an image processing device, an image processing method, and a program suitably used to perform filter processing especially with a small-scale circuit.

Description of the Related Art

Conventionally, as a method for realizing filter processing of a multi-tap with a small-scale calculator, a method for dividing a filter of the multi-tap into a plurality of filters having a smaller number of taps, and performing the filter processing has been discussed. For example, Japanese Patent Application Laid-Open No. 2004-145615 discusses a method for dividing a filter, to which predetermined filter coefficients are allocated, into sub-filters of a predetermined size or less, and performing the filter processing for each sub-filter. According to this method, a filter processing result of each sub-filter is added in units of pixels, so that a result similar to a result of a case where the filter processing is performed with the predetermined filter coefficients can be acquired.

SUMMARY OF THE INVENTION

An image processing device according to the present invention includes a dividing unit configured to divide a filter into divided filters of a predetermined number of taps, a filter processing unit configured to perform filter processing for an input image using the divided filters, an integrating unit configured to integrate a processing result of each divided filter, wherein the integrating unit integrates the processing result of the each divided filter in an order according to a value of a filter coefficient of the divided filter.

Further features of the present invention will become apparent from the following description of exemplary embodiments (with reference to the attached drawings).

DESCRIPTION OF THE EMBODIMENTS

Figure 1:
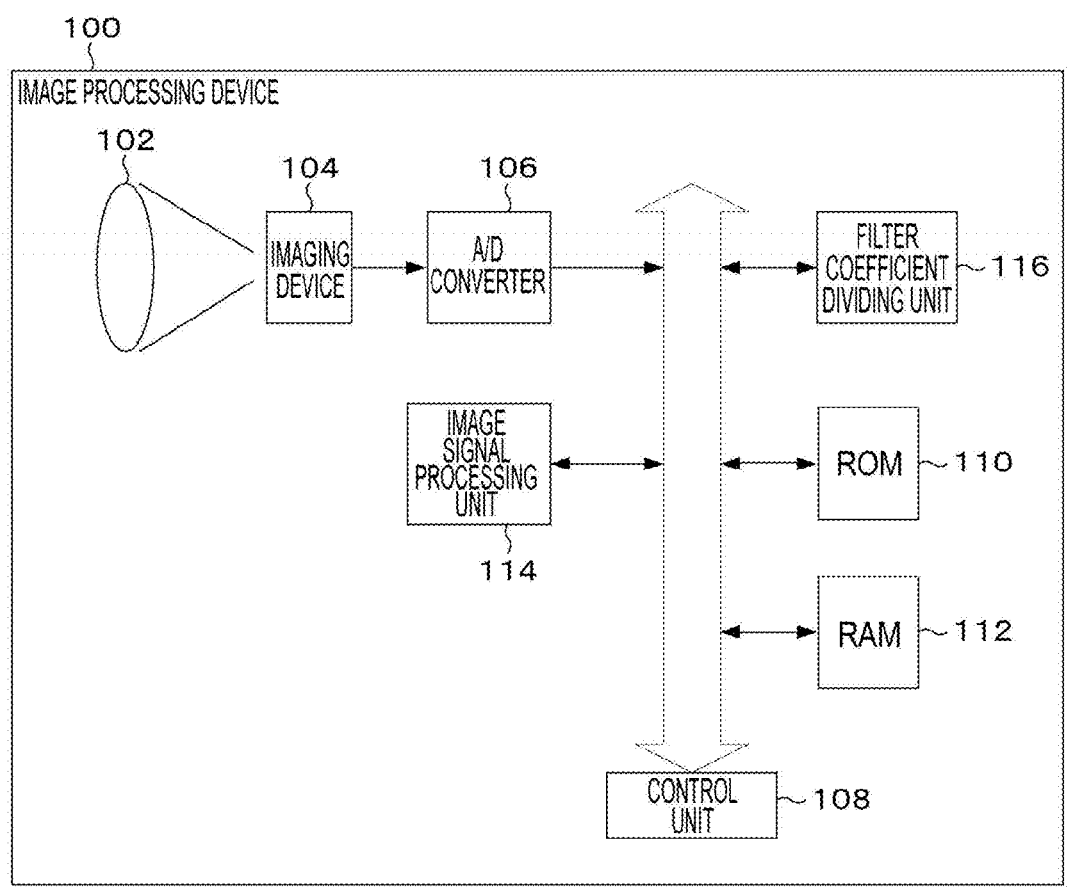
FIG. 1 is a block diagram illustrating a configuration example of an image processing device according to an exemplary embodiment.

Hereinafter, exemplary embodiments of the present invention will be described in detail based on the appended drawings.

In the conventional technology discussed in Japanese Patent Application Laid-Open No. 2004-145615 described above, a rounding error may occur at the time of integration of the filter processing results, depending on distribution of filter coefficients of a multi-tap filter before division or a method for dividing the filter. Therefore, a difference may occur between the result of the conventional technology and a filter processing result of the multi-tap filter due to influence of the rounding error.

Elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any electronic devices. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory, ROM, EPROM). Examples of firmware may include microcode, writable control store, micro-programmed structure. When implemented in software or firmware, the elements of an embodiment may be the code segments to perform the necessary tasks. The software/firmware may include the actual code to carry out the operations described in one embodiment, or code that emulates or simulates the operations. The program or code segments may be stored in a processor or machine accessible medium. The "processor readable or accessible medium" or "machine readable or accessible medium" may include any medium that may store information. Examples of the processor readable or machine accessible medium that may store include a storage medium, an electronic circuit, a semiconductor memory device, a read only memory (ROM), a flash memory, a Universal Serial Bus (USB) memory stick, an erasable programmable ROM (EPROM), a floppy diskette, a compact disk (CD) ROM, an optical disk, a hard disk, etc. The machine accessible medium may be embodied in an article of manufacture. The machine accessible medium may include information or data that, when accessed by a machine, cause the machine to perform the operations or actions described above. The machine accessible medium may also include program code, instruction or instructions embedded therein. The program code may include machine readable code, instruction or instructions to perform the operations or actions described above. The term "information" or "data" here refers to any type of information that is encoded for machine-readable purposes. Therefore, it may include program, code, data, file, etc.

All or part of an embodiment may be implemented by various means depending on applications according to particular features, functions. These means may include hardware, software, or firmware, or any combination thereof. A hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

In the present exemplary embodiment, a filter of a multi-tap is divided into a plurality of smaller filters for each predetermined filter size. Then, filter processing is applied to an input image for each divided filter, and obtained intermediate images are integrated, whereby a more highly precise filter processing result in which a rounding error of the integration is suppressed can be obtained.

FIG. 1 is a block diagram illustrating a configuration example of an image processing device 100 according to the present exemplary embodiment. Hereinafter, filter processing according to the present exemplary embodiment will be described with reference to FIG. 1.

In FIG. 1, an imaging lens 102 optically focuses a captured image on an imaging device 104. An imaging device 104 converts the captured image into an analog electrical signal. Further, the imaging device 104 includes a plurality of color filters. An A/D converter 106 converts the analog signal output from the imaging device 104 into a digital signal.

A control unit 108 controls the entire image processing device 100, and controls flows of data among the A/D converter 106, a ROM 110, a RAM 112, an image signal processing unit 114, and a filter coefficient dividing unit 116. The ROM 110 is a non-volatile memory in which filter coefficients and the like are stored. The RAM 112 is a memory for temporarily storing the captured image and an intermediate image to which the filter processing is applied. The filter coefficient dividing unit 116 divides a filter of a multi-tap stored in the ROM 110 into a plurality of filters of a smaller number of taps.

Figure 3:
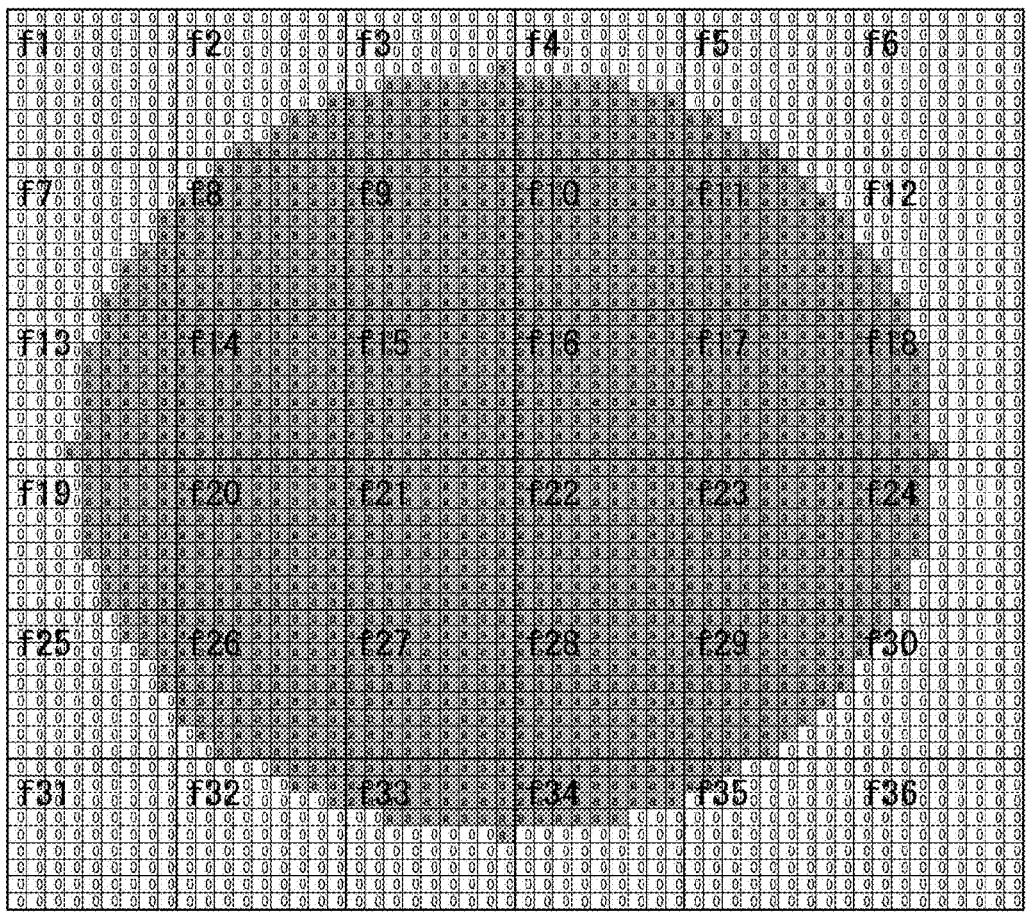
FIG. 3 is a diagram for describing filter coefficients applied to a captured image.

FIG. 3 is a diagram for describing filter coefficients to be applied to a captured image. As illustrated in FIG. 3, the filter of the multi-tap of the present exemplary embodiment forms a columnar filter shape. Further, the filter size is (47 taps)×(47 taps) in the columnar portion. f1, f2, ... f36 are two-dimensional filters with a size of (9 taps)×(9 taps), and can express up to (54 taps)×(54 taps) two-dimensional filter coefficients with 6 blocks in the vertical direction and 6 blocks in the horizontal direction. In the present exemplary embodiment, the filter coefficient in a peripheral portion of the filter of the multi-tap is 0, and the filter coefficient in a central portion of the filter is a. The filter coefficients are held in the ROM 110 in a 16-bit fixed-point format. Note that the shape of the filter is not limited to the columnar shape, and filter coefficients in any shape may be applied.

Figure 4:
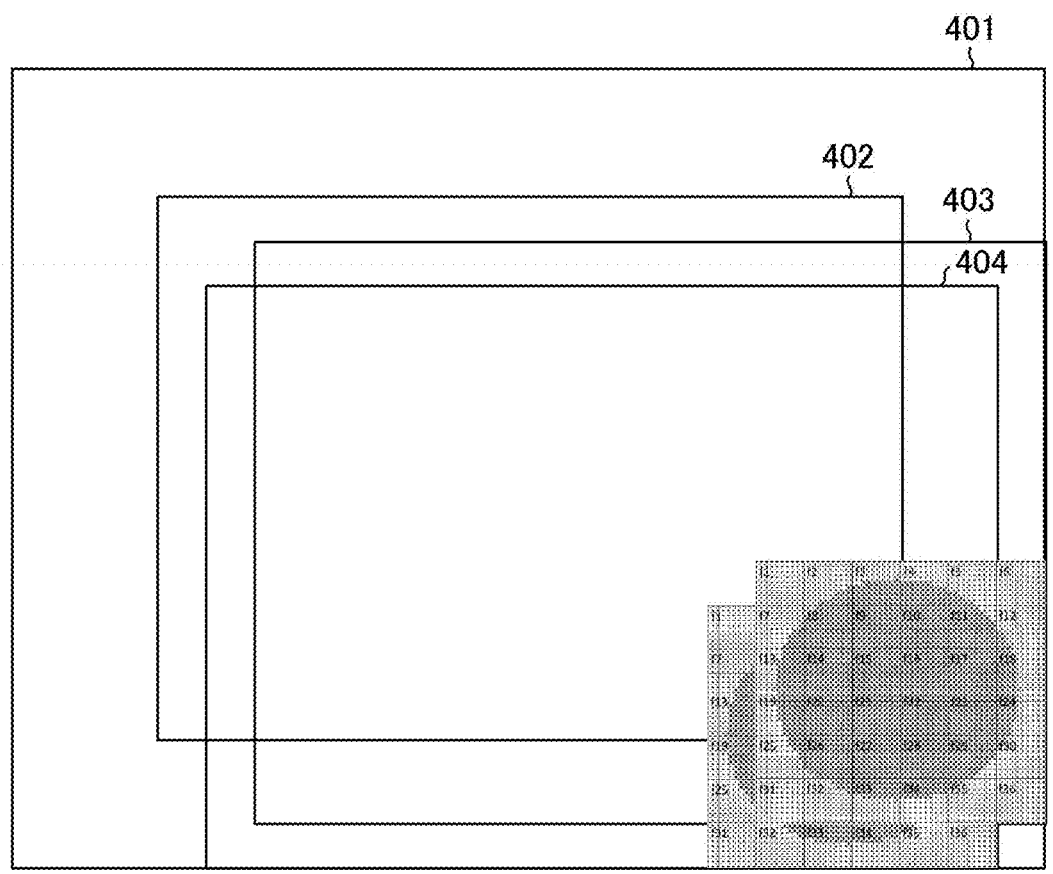
FIG. 4 is a diagram for describing a state in which a two-dimensional filter is applied to a captured image.

FIG. 4 is a diagram for describing a state in which the two-dimensional filter illustrated in FIG. 3 is applied to a captured image. In FIG. 4, a region 401 is a region of a captured input image. Further, a region 402 is a region of an output image after the (54 taps)×(54 taps) two-dimensional filter is applied.

Figure 2A:
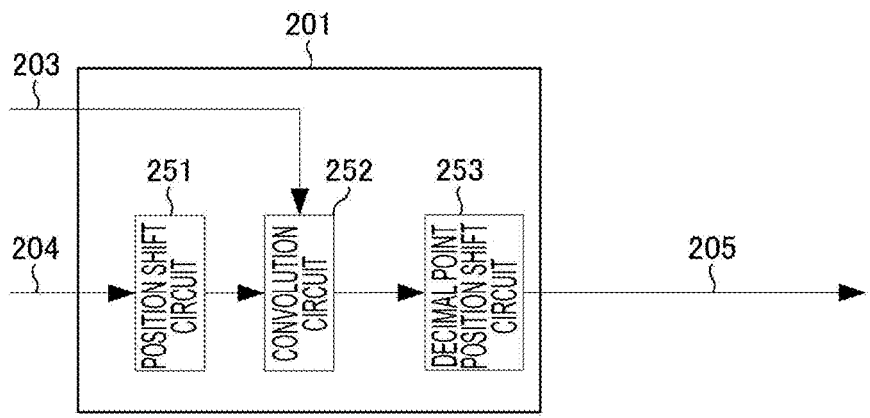
FIGS. 2A to 2C are block diagrams illustrating a detailed configuration example of an image signal processing unit.
Figure 2B:
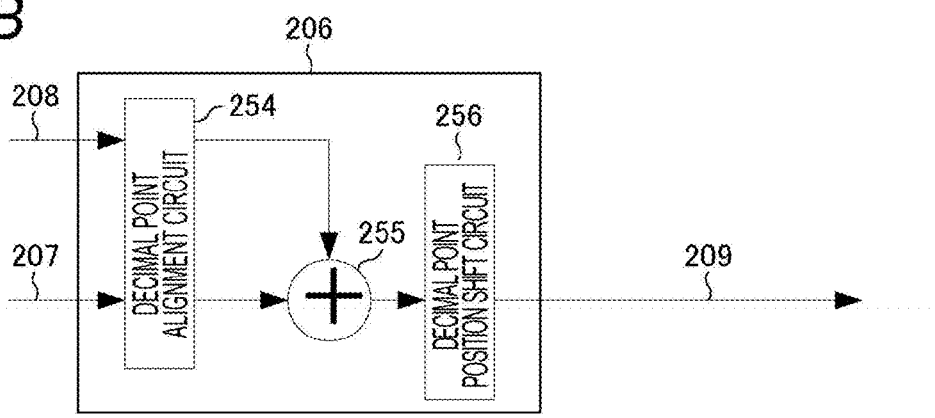
Figure 2C:
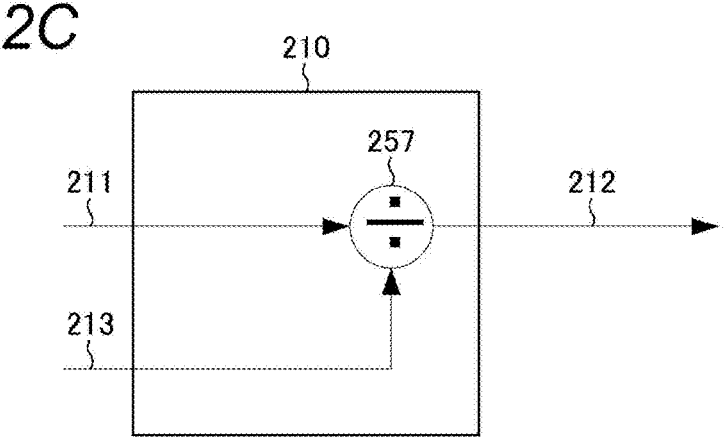

FIGS. 2A to 2C are diagrams for describing a detailed configuration example of the image signal processing unit 114. As illustrated in FIGS. 2A to 2C, the image signal processing unit 114 includes a filter circuit 201, an image addition circuit 206, and an image division circuit 210.

The filter circuit 201 illustrated in FIG. 2A is a circuit that applies (9 taps)×(9 taps) filter processing. The filter circuit 201 inputs a filter coefficient 203 and an input image 204, and outputs a filter processing result 205. In the present exemplary embodiment, a value of the filter coefficient 203 is expressed in a 12-bit fixed-point format. Similarly, a value of the filter processing result 205 is expressed in a 16-bit fixed-point format. Further, the value of the input image 204 is held in a 12-bit integer. Note that data widths of the filter coefficient 203, the input image 204, and the filter processing result 205 are not limited to the above-described examples, and are changed according to a circuit structure.

The filter circuit 201 reads out a desired region of the input image, and applies the filter processing. First, the filter circuit 201 selects one filter coefficient from among the filter coefficients of the filters f1 to f36 illustrated in FIG. 3 and sets the selected filter coefficient as a filter coefficient h1, and applies the filter coefficient h1 to the input image. At this time, the filter circuit 201 selects a filter coefficient having a small sum of the filter coefficients (a sum of the filter coefficients of pixels in the divided filter) from among the filters f1 to f36, as the filter coefficient h1. In the present exemplary embodiment, the filter circuit 201 selects, as the filter coefficient h1, the filter coefficient of the filter f30 having a minimum sum of the filter coefficients except the filters f1, f6, f31, and f36 having the sum of the filter coefficients of zero. When a calculation load of processing for re-arranging the filter coefficients in an order of size of the sum of the filter coefficients is not allowed, the filter circuit 201 may select one filter coefficient from among the filters having the sum of the filter coefficients within a predetermined range.

Next, a position shift circuit 251 partially reads out a region 403 that is a part of the input image illustrated in FIG. 4, for example. Then, the position shift circuit 251 generates a first intermediate image by applying the filter processing to the region 403. A convolution circuit 252 in the filter circuit 201 secures calculation accuracy to avoid overflow of the filter processing result. That is, in the present exemplary embodiment, the filter coefficient 203 has 16 bits and the input image 204 has 12 bits, and thus the filter processing result 205 has a structure having 28 bits. Further, the filter circuit 201 shifts a position of the decimal point of the filter processing result in a fixed-point format with a decimal point position shift circuit 253 provided immediately before an output of the filter processing result, and generates the first intermediate image. In the present exemplary embodiment, the data width of the intermediate image per pixel is 12 bits. Therefore, the filter circuit 201 outputs the filter processing result after shifting the filter processing result by 16 bits to the right.

The position of the decimal point is determined by calculating a maximum value of the filter processing result from the sum of the filter coefficients, and considering a range in which the maximum value can be expressed. For example, when the sum of the filter coefficient is $2^{-8}$, the maximum value of the filter processing results is $(2^{12}-1) \cdot 2^{-8} = 2^4 - 2^{-8}$. Therefore, the position of the decimal point is set such that 4 bits for an integer part and 8 bits for a decimal part are obtained.

Following that, the filter coefficient of the filter f35, which has the same sum of the filter coefficients, is similarly selected as a filter coefficient h2, and the filter processing is applied to a region 404 illustrated in FIG. 4, so that a second intermediate image is generated. The position of the decimal point of the second intermediate image is determined similarly to the first intermediate image.

The image addition circuit 206 illustrated in FIG. 2B inputs the first and second intermediate images as a first input image 207 and a second input image 208 to generate a first integrated image, and outputs the first integrated image as an output result 209. Here, when the positions of the decimal points do not accord between the first and second intermediate images, the positions of the decimal points are aligned in a decimal point alignment circuit 254, and then the first and second intermediate images are integrated in an adder 255. The first integrated image is output after the position of the decimal point is shifted by a decimal point position shift circuit 256 immediately before the output of the image addition circuit 206. A shift amount of the position of the decimal point is determined considering a range in which a maximum value of an integration result of the first and second intermediate images can be expressed, similarly to the filter circuit 201.

Meanwhile, the filter circuit 201 selects the filter coefficient of the filter f12 having the second smallest sum of the filter coefficients as a filter coefficient h3, shifts the region of the input image and performs the filter processing in a similar manner, and generates a third intermediate image. Then, the image addition circuit 206 generates a second integrated image by adding the above-described first integrated image and the third intermediate image. Hereinafter, the filter circuit 201 similarly selects the filter coefficients having a next smallest sum of the filter coefficients as filter coefficients h4 to h32 in order from among the filters f1 to f36 (excluding f1, f6, f31, and f36) of FIG. 3, which have not been selected yet. Note that the sum of the filter coefficients of the filters f1, f6, f31, and f36 are zero, and thus these filters are not objects to be processed. Then, finally, the filter circuit 201 generates a $31^{st}$ integrated image.

As described above, in the present exemplary embodiment, the integration is performed in order from a filter coefficient having a smaller sum of the filter coefficients. When the sum of the filter coefficients is small, the maximum value of the filter processing result is small. Therefore, the bit width of the decimal part can be increased. For this reason, by selecting the filter coefficient in order from one having a smaller sum of the filter coefficients, the integration result of the decimal part can be substantially reflected. Then, the maximum value of the filter processing result becomes larger as the sum of the filter coefficients becomes larger. Therefore, the position of the decimal point is shifted, and the bit width of the integer part is increased. In this way, the processing result is integrated in order from the filter coefficient having a smaller sum of the filter coefficients, whereby a calculation error can be made small.

Here, an effect caused by the processing of the present exemplary embodiment will be described using FIGS. 5A to 5C. Here, for simple description, an effect will be described based on differences in a state where the processing results with the divided filters are integrated up to three. The three divided filters are g1, g2, and g3, and magnitude relationship among the sums of the filter coefficients of the divided filters g1, g2, and g3 is g1=g3<g2. Further, the filter processing results with the divided filters g1, g2, and g3, that is, values of predetermined pixel positions of the intermediate images are F1, F2, and F3.

Figure 5A:
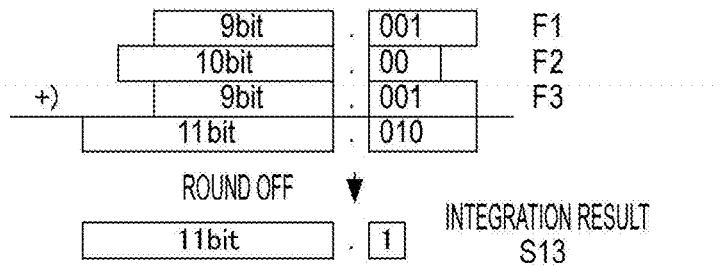
FIGS. 5A to 5C are diagrams for describing differences in integration results according to integration orders.
Figure 5A:
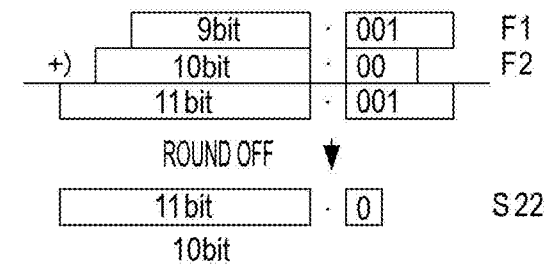

FIG. 5A illustrates a result of integration without generating the intermediate images that are filter processing results of the three divided filters, and no rounding error occurs, which occurs when intermediate images are output and integrated. In this case, as the decimal part of an output integration result S13, "1" is output.

Figure 5B:
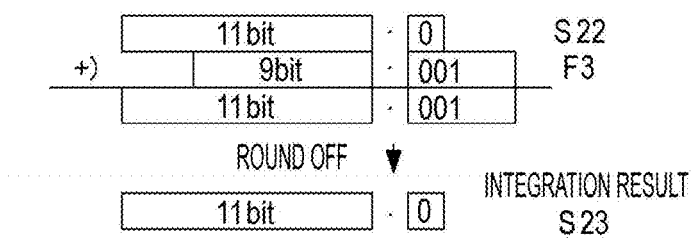
Figure 5B:
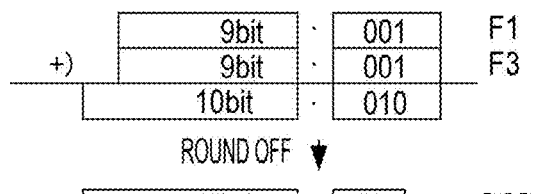

FIG. 5B illustrates a result of integration without considering the integration order of the intermediate images that are filter results of the three divided filters. First, in the first integration processing, the intermediate image F1 and the intermediate image F2 are integrated, and an integrated image S22 is output. At that time, the third decimal place of the decimal part is "1" but the integer part is 11 bits. Therefore, only one bit can be secured in the decimal part, and the decimal part is output as "0" by round off. Next, the integrated image S22 and the intermediate image F3 are integrated, and an integrated image S23 is output. At that time, the third decimal place of the decimal part is "1", and similarly, the decimal part is output as "0". As a result, the decimal part of the integrated image S23 is "0", and a calculation error due to rounding occurs, compares with the result illustrated in FIG. 5A.

Figure 5C:
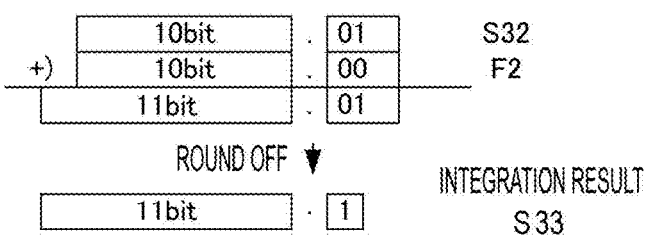

FIG. 5C illustrates a processing result of the present exemplary embodiment, and illustrates a result of integration considering the integration order of the intermediate images that are filter results of the three divided filters. First, in the first integration processing, the intermediate image F1 and the intermediate image F3 are integrated, and an integrated image S32 is output. Next, the integrated image S32 and the intermediate image F2 are integrated, and an integrated image S33 is output. Since the decimal part is reflected in the integrated image S32. Therefore, the decimal part of the integrated image S33 is "1" and accords with the result of FIG. 5A, and a calculation error due to rounding does not occur. From the results illustrated in FIGS. 5A to 5C, the calculation error due to rounding can be suppressed by considering the integration order in ascending order of the sum of the filter coefficients, like the present exemplary embodiment.

Note that, in the present exemplary embodiment, the filter coefficients of the filters f1 to f36 illustrated in FIG. 3 are stored in the ROM 110 in advance, and are expanded on the RAM 112 of FIG. 1 and are then output to the filter circuit 201 of FIG. 2A. Meanwhile, the control unit 108 may generate the (54 tap)×(54 taps) two-dimensional filter illustrated in FIG. 3, on the RAM 112, divide the two-dimensional filter into 36 filters f1 to f36, and calculate the respective filter coefficients. In this way, a data amount to be stored in the ROM 110 may be reduced.

When the $31^{st}$ integrated image is generated by the above procedure, the image division circuit 210 inputs a normalization factor 213 stored in the ROM 110, and inputs the $31^{st}$ integrated image 211. Then, the image division circuit 210 divides the $31^{st}$ integrated image 211 by the normalization factor 213, and outputs an image 212 of the final filter processing result.

As described above, according to the image processing device 100 of the present exemplary embodiment, when a filter processing result, which can be obtained by the two-dimensional filter processing of 54 taps, is obtained by processing with a small two-dimensional filter like 9 taps, the integration order is considered. Accordingly, the influence of a rounding error due to the integration is suppressed, and a more highly precise filter processing result can be acquired.

Other Exemplary Embodiment

The present invention can be realized by processing for supplying a program that realizes one or more functions of the exemplary embodiment to a system or a device through a network or a storage medium, and reading out and executing the program by one or more processor in a computer of the system or the device. Further, the present invention can be realized by a circuit (for example, an ASIC) that realizes the one or more functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-156549, filed Jul. 31, 2014, which is hereby incorporated by reference herein in its entirety.

What is claimed is:

1. An image processing device comprising:
    a dividing unit configured to divide a filter into divided filters of a predetermined number of taps;
    a filter processing unit configured to perform filter processing for an input image using the divided filters; and
    an integrating unit configured to integrate a processing result of each divided filter, wherein
    the integrating unit integrates the processing result of the each divided filter in an order according to a value of a filter coefficient of the divided filter.

2. The image processing device according to claim 1, wherein the integrating unit integrates the processing result in order from the processing result of the divided filter having a small sum of filter coefficients.

3. The image processing device according to claim 1, wherein the integrating unit integrates the processing result of the divided filter having the sum of filter coefficients within a predetermined range.

4. The image processing device according to claim 1, wherein the filter processing unit selects the divided filter for which the filter processing is performed according to the value of a filter coefficient of the divided filter, and
    the integrating unit integrates the processing result in order from the selected divided filter.

5. The image processing device according to claim 1, wherein the filter processing unit changes a position of a decimal point of the processing result according to the value of a filter coefficient of the divided filter.

6. An image processing method comprising:
    dividing a filter into divided filters of a predetermined number of taps;
    performing filter processing for an input image for each divided filter using the divided filters; and
    integrating a processing result of each divided filter, wherein,
    in the integrating, the processing result of the each divided filter is integrated in an order according to a value of a filter coefficient of the divided filter.

7. The image processing method according to claim 6, wherein the integrating integrates the processing result in order from the processing result of the divided filter having a small sum of filter coefficients.

8. The image processing method according to claim 6, wherein the integrating integrates the processing result of the divided filter having the sum of filter coefficients within a predetermined range.

9. The image processing method according to claim 6, further comprising selecting the divided filter for which the filter processing is performed according to the value of a filter coefficient of the divided filter, and
    integrating the processing result in order from the selected divided filter.

10. The image processing method according to claim 6, further comprising changing a position of a decimal point of the processing result according to the value of a filter coefficient of the divided filter.

11. A non-transitory computer readable storage medium for causing a computer to execute the steps of:
    dividing a filter into divided filters of a predetermined number of taps;
    performing filter processing for an input image for each divided filter using the divided filters; and
    integrating a processing result of each divided filter, wherein,
    in the integrating, the processing result of the each divided filter is integrated in an order according to a value of a filter coefficient of the divided filter.

12. The non-transitory computer readable storage medium according to claim 11, wherein the integrating integrates the processing result in order from the processing result of the divided filter having a small sum of filter coefficients.

13. The non-transitory computer readable storage medium according to claim 11, wherein the integrating integrates the processing result of the divided filter having the sum of filter coefficients within a predetermined range.

14. The non-transitory computer readable storage medium according to claim 11, further comprising selecting the divided filter for which the filter processing is performed according to the value of a filter coefficient of the divided filter, and
    integrating the processing result in order from the selected divided filter.

15. The non-transitory computer readable storage medium according to claim 11, further comprising changing a position of a decimal point of the processing result according to the value of a filter coefficient of the divided filter.

* * * * *